July 30, 1963  R. A. FRITZ  3,099,438
DOOR CONTROL APPARATUS
Filed Nov. 28, 1960  7 Sheets-Sheet 1

INVENTOR.
RUDOLPH A. FRITZ
BY

ATTORNEY

INVENTOR.
RUDOLPH A. FRITZ
BY

ATTORNEY

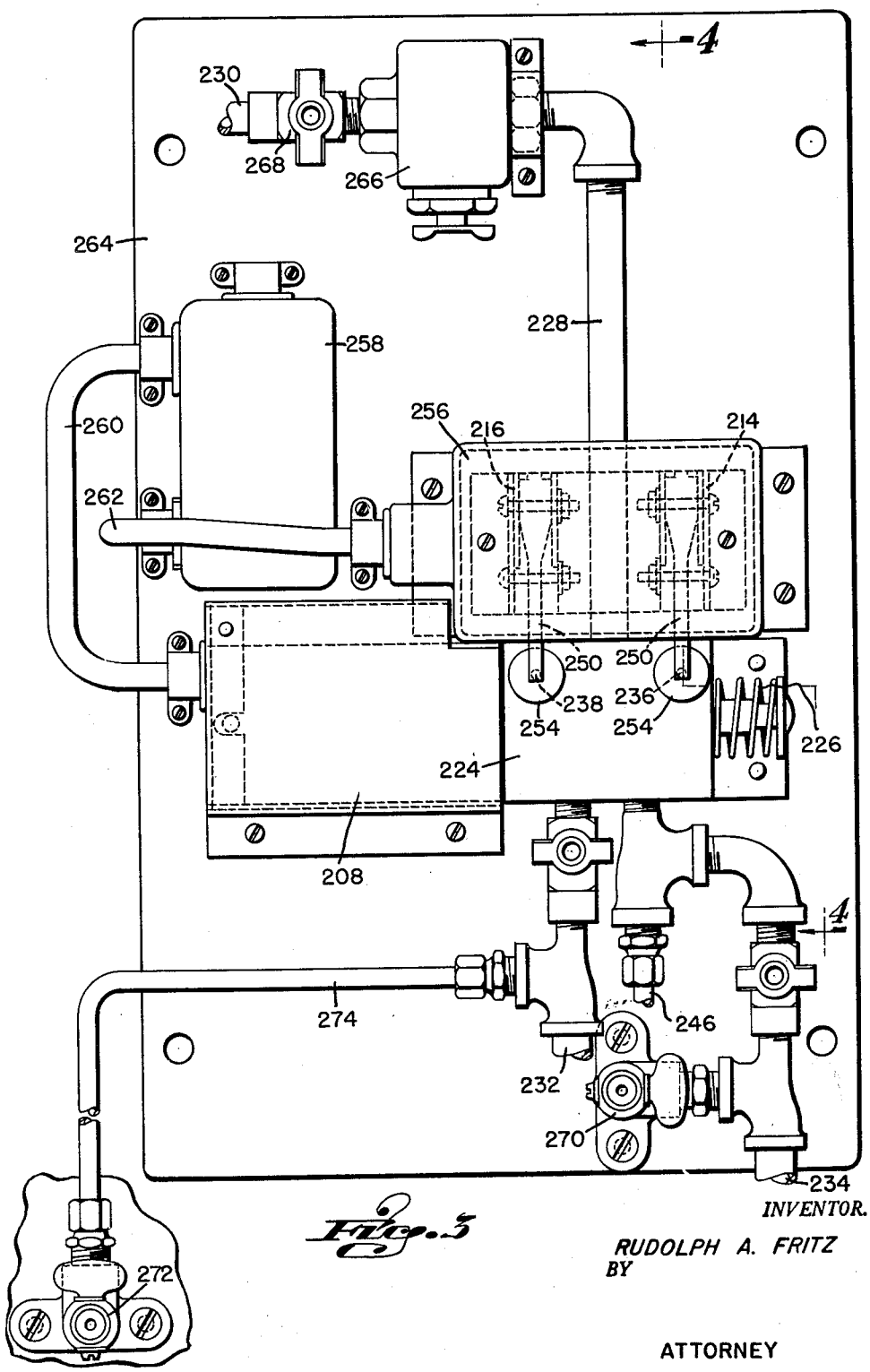

July 30, 1963   R. A. FRITZ   3,099,438
DOOR CONTROL APPARATUS
Filed Nov. 28, 1960   7 Sheets-Sheet 4
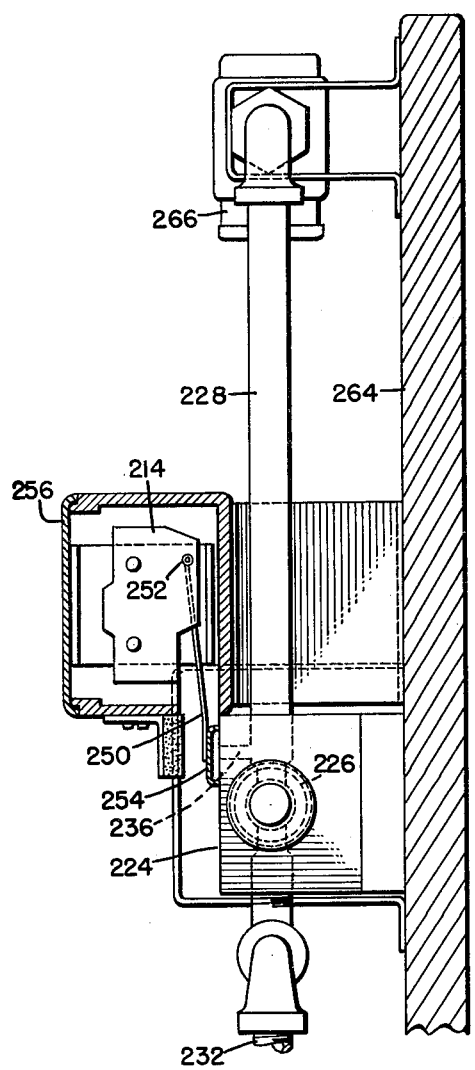
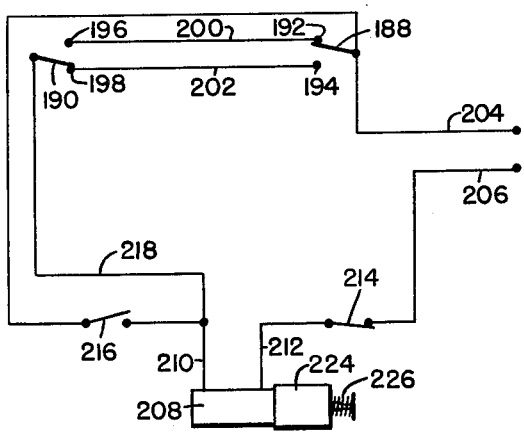
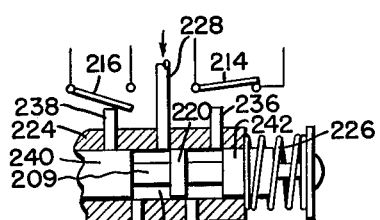
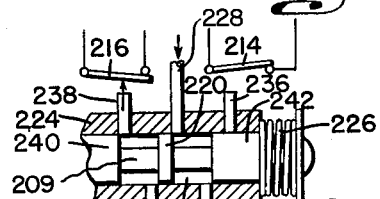
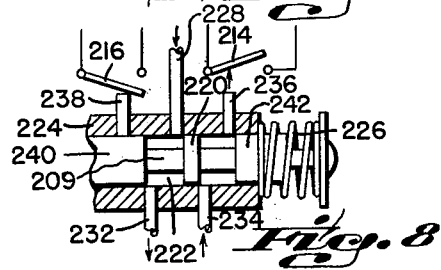
INVENTOR.
RUDOLPH A. FRITZ
BY
ATTORNEY

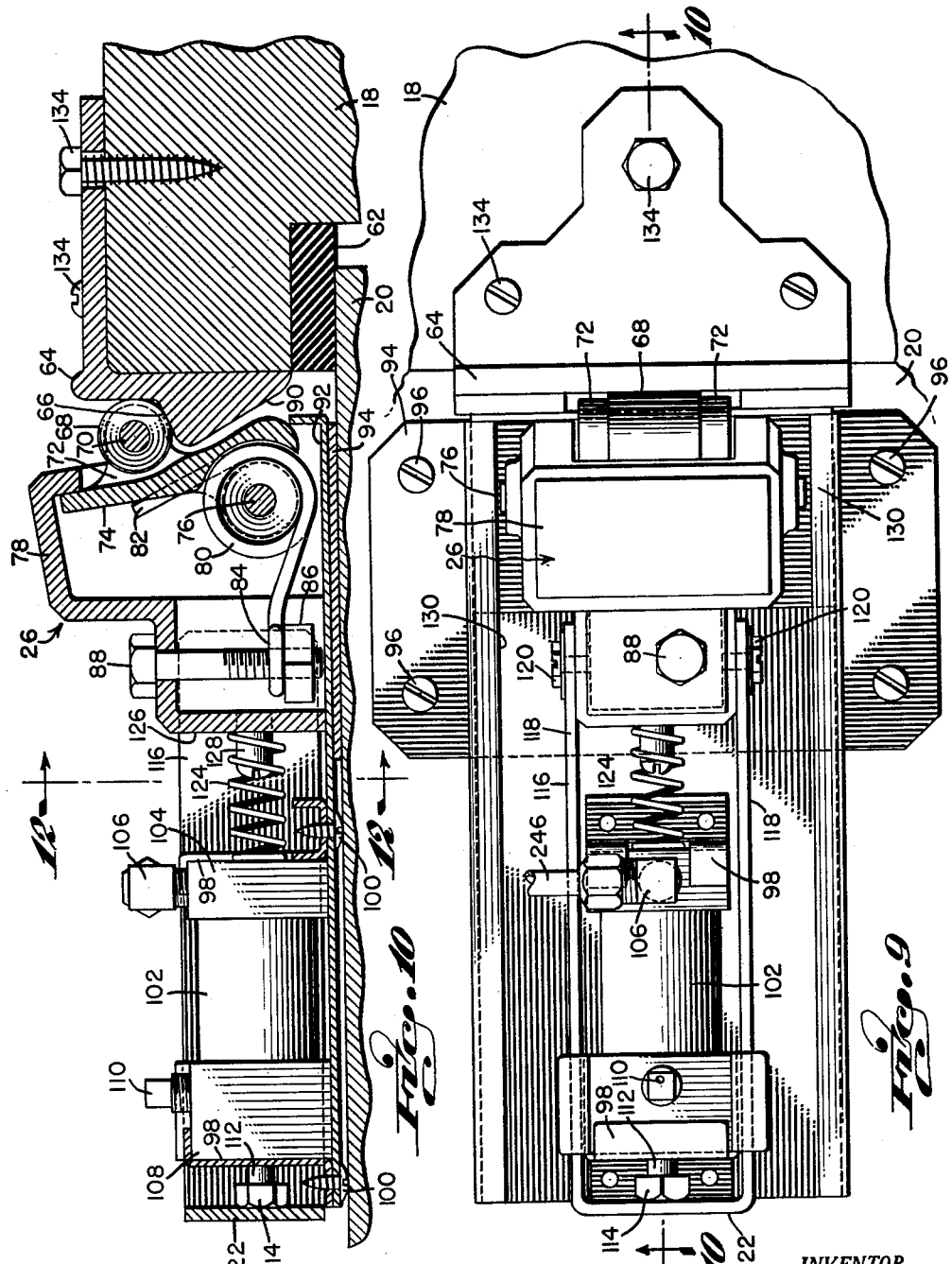

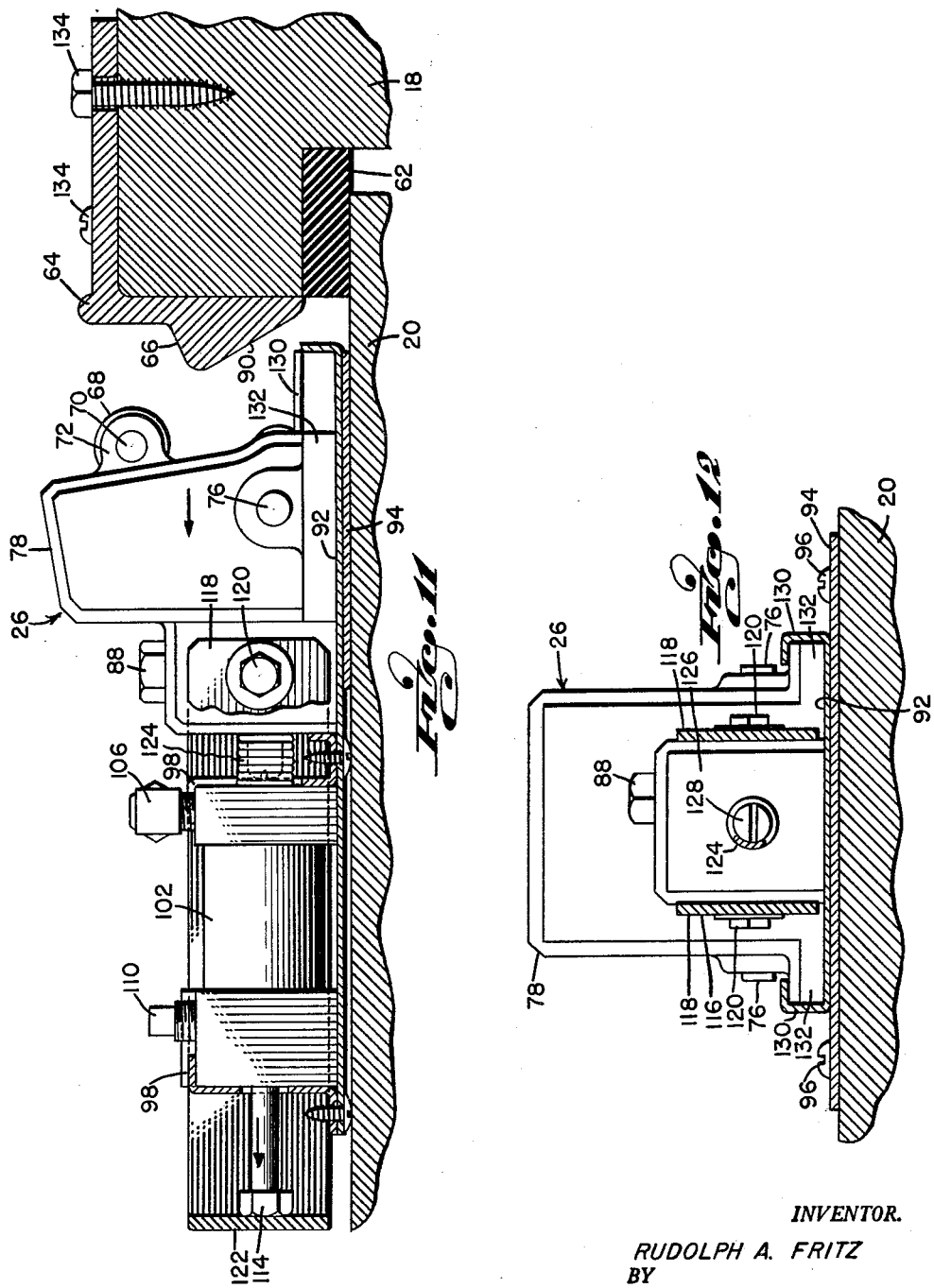

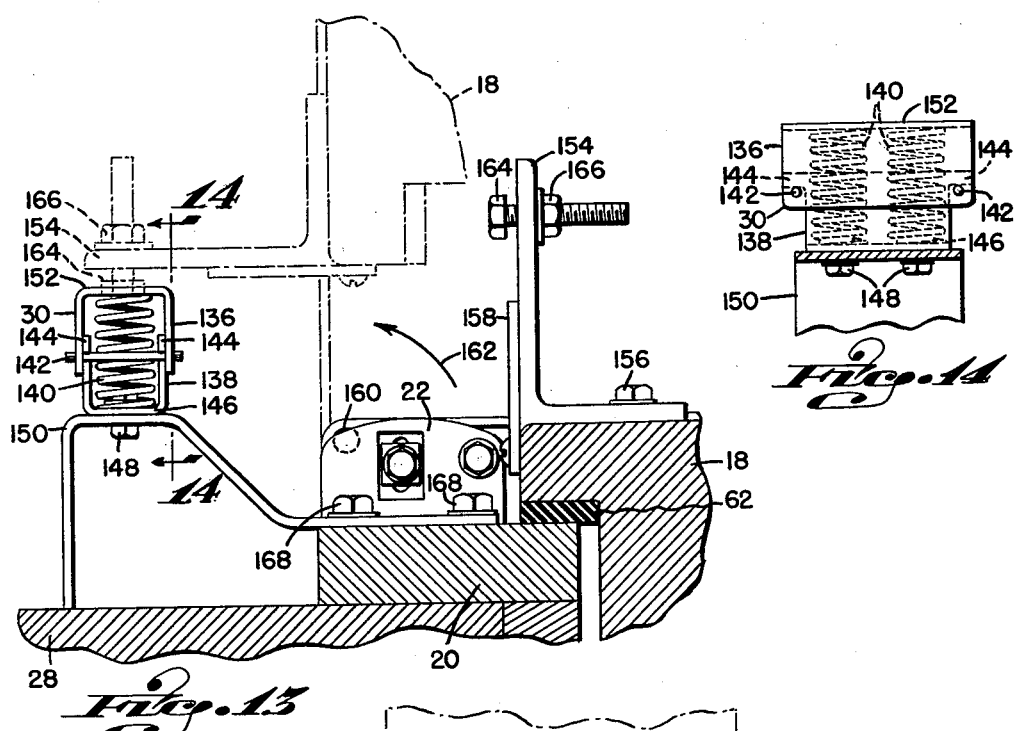

United States Patent Office 3,099,438
Patented July 30, 1963

3,099,438
DOOR CONTROL APPARATUS
Rudolph A. Fritz, Cincinnati, Ohio, assignor to Chase Industries, Inc., Cincinnati, Ohio, a corporation of Ohio
Filed Nov. 28, 1960, Ser. No. 72,032
3 Claims. (Cl. 268—66)

The present invention relates to door control apparatus, and is concerned in particular with the movement and control of heavy or large doors by pneumatic means primarily.

The invention has particular application to heavy doors of the type found in large freezer installations. In such installations for example, it is common practice to drive a vehicle carrying a load of goods up to the door, open the door, drive in and close the door behind the vehicle. It is desirable to provide a power operated door opener operable from the vehicle to permit the door to be opened and closed without requiring the driver to leave his seat for both operations; and to eliminate the physical strain which would be required for manual door operation.

Power devices for control of heavy doors have been proposed. Certain of these are required by their design to be applied between the top of the door and the door frame. Because of the tremendous inertia of a heavy door, the constant application of force to the top causes the door, over a period of time, to twist and permanently deform. The deformation ultimately results in the inability to create a proper seal between the door and frame, which, in a freezer installation for example, is undesirable.

Certain prior door operators are spring operated to close and pneumatically operated to open. A spring used as a part of the driving force has the disadvantage of being difficult to control. Further, if the pneumatic system should fail, with a person in a freezer, that person must overcome not only the weight of the door, but also the spring force, to open the door.

In accordance with the present invention, a door operator is provided which is pneumatically driven in both opening and closing directions. The operator design permits the operator to be positioned intermediate the top and bottom of the door so as to eliminate the undesirable twisting referred to above.

An object of the invention is to provide a simple and inexpensive door control apparatus which requires a minimum of maintenance attention, and which may be serviced when necessary by relatively unskilled personnel.

Another object of the invention is to incorporate in a door control apparatus safety means to preclude accidental closing of a door unexpectedly upon a person passing through the doorway, by reason of the act of another person attempting to initiate a door closing movement during an opening cycle of the door.

Another object is to provide a pneumatic door control apparatus which easily may be adapted for application to doors of different types.

The foregoing and other objects are attained by the means described herein and disclosed in the accompanying drawings, in which:

FIG. 3 is a front elevational view on an enlarged scale, showing an air control unit which constitutes part of the invention.

FIG. 4 is a cross-sectional view taken on line 4—4 of FIG. 3.

FIG. 5 is an electric circuit diagram for the air control unit.

FIGS. 6, 7, and 8 are diagrammatic views showing various conditions and relationships of air valves and electric switches, occurring during the opening and closing cycles of a door equipped with the apparatus of the invention.

FIG. 9 is a plan view of a pneumatically operated door fastener, shown in operative closed-door position.

FIG. 10 is a cross-sectional view taken on line 10—10 of FIG. 9.

FIG. 11 is a view substantially similar to FIG. 10, but showing the fastener in retracted position for release of the door preparatory to opening.

FIG. 12 is a cross-sectional view taken on line 12—12 of FIG. 10.

Figure 1:
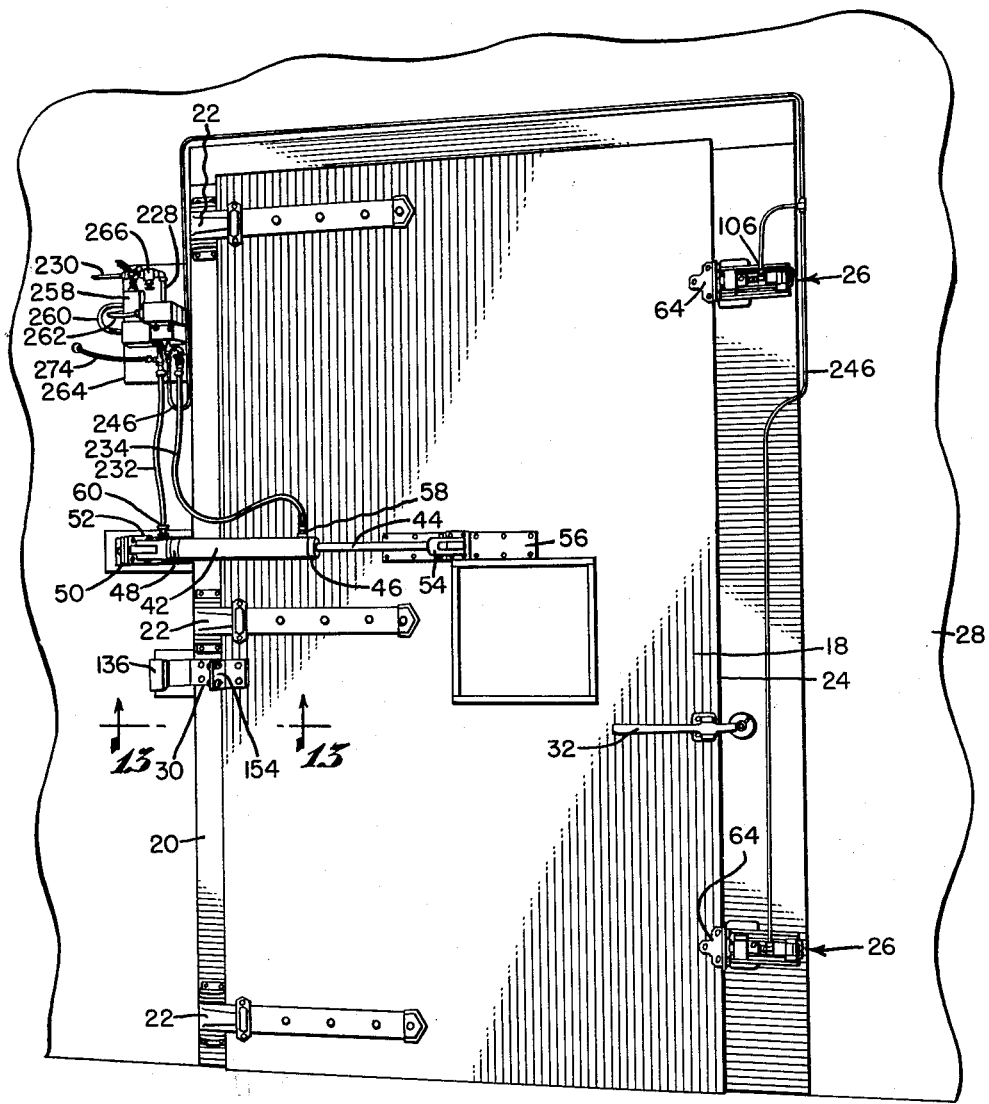
FIG. 1 is a front perspective view of an infitting door in closed position upon a wall opening, and equipped with a door control apparatus of the invention.

FIG. 13 is a cross-sectional view at the hinge side of a door, taken on line 13—13 of FIG. 1, and showing details of a snubber for the door.

FIG. 14 is a fragmentary elevational view of the snubber, taken on line 14—14 of FIG. 13.

Figure 2:
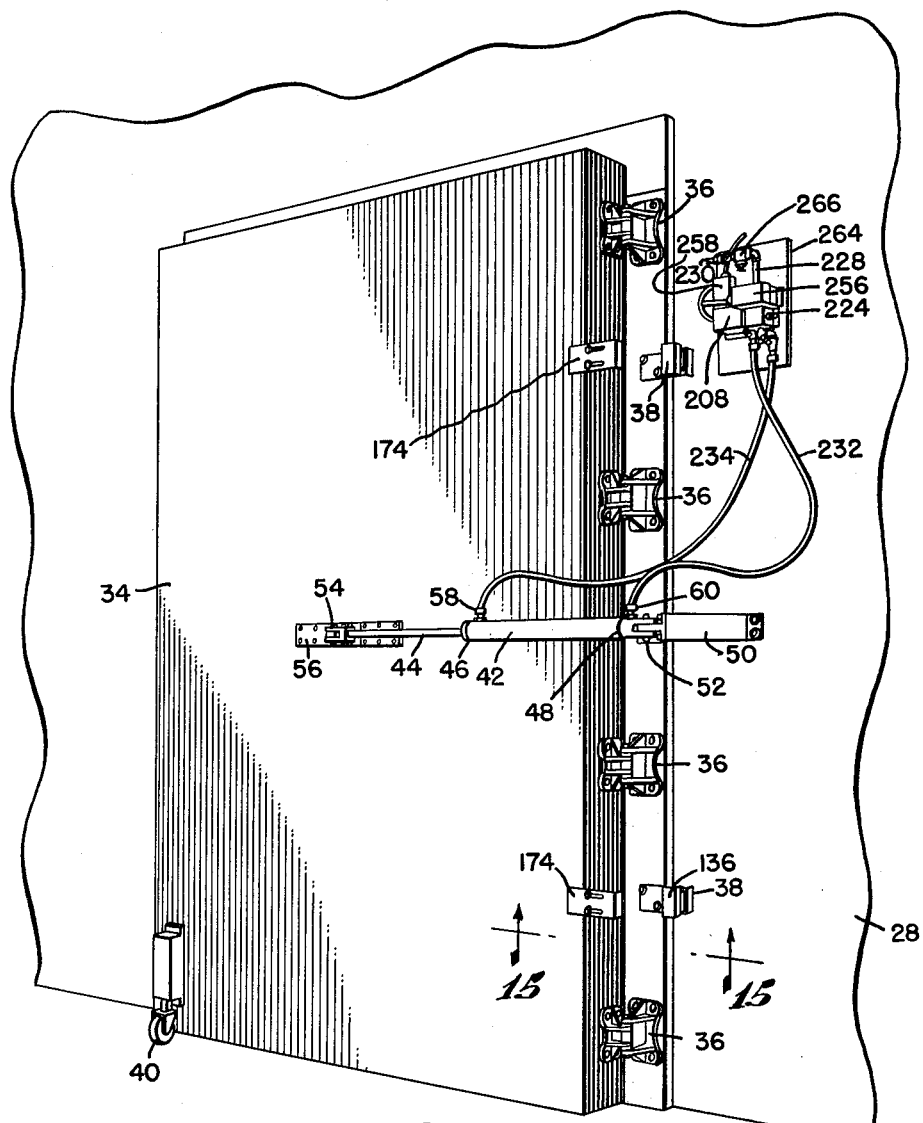
FIG. 2 is a front perspective view of an overlapping type door in closed position upon a wall opening, and equipped with a door control apparatus in accordance with the present invention.

FIG. 15 is a cross sectional view of a modified snubber arrangement, taken on line 15—15 of FIG. 2.

In the drawing, FIG. 1, 18 indicates an infitting door hinged upon an open door frame 20 by means of hinges 22, so that the side edge 24 of the door may be swung to open and closed positions about the hinges, to either expose or cover the frame opening. When the door is closed, it may be held tightly against its circumferential gasket by means of one or more door fasteners indicated generally by the character 26. An apertured compartment wall which supports the door frame is indicated at 28, and 30 indicates generally a snubber which cushions and limits the opening movements of the door. At 32 is a manual door opener of conventional design.

FIG. 2 illustrates an overlapping type of door, having basically the same hardware as the door of FIG. 1, though modified to some degree in view of the difference in door design. Here the door is identified by the character 34, its hinges by 36, and its snubbers by 38. In either case the swinging edge of the door might have the auxiliary support of a floor roller 40, if desired.

The doors 18 and 34 are adapted to be swung about their hinges by a pneumatic motor comprising a cylinder 42, a piston rod 44, and a piston on the rod slidable inside the cylinder. The piston is of ordinary design and function, and is not shown in the drawings. It may be noted, however, that in the closed position of the door, the piston will be disposed near the head end 46 of the cylinder, whereas in the open position of the door the piston will assume a position near the base end 48 of the cylinder. The base end 48 has pivotal connection at 52 with a bracket 50 fixed to the door frame or wall 28, and the connection 52 is located in advance of the plane of the door so that pull exerted by the piston rod may act to open the door about its hinges.

The free end of piston rod 44 carries a clevis 54 or equivalent device whereby the rod may be pivotally connected to the door, or to a plate 56 fixed thereon.

From the foregoing, it will be understood that air under pressure fed to the cylinder at the fitting 58 will force the piston rod toward the base end of the cylinder, thereby to pneumatically open the door. At the same time, air will be exhausted from the base end of the cylinder through fitting 60. Conversely, with the door in open position, air under pressure fed to the cylinder at fitting 60 will act upon the piston to close the door, while the cylinder exhausts through the fitting 58. The air exhausts just mentioned are to be utilized in the operation of the control unit, as will later be explained in detail.

Pneumatic power is to be employed also in deactivating the door fasteners 26, which normally in the closed position of the door apply a force thereon to compress the gasket 62 (FIG. 10) between the door and the frame. As illustrated by FIGS. 9 and 10, the door carries a fixed strike or keeper 64 having an inclined face 66 upon which a spring-projected roller or impact element 68 bears while the door is closed. Roller 68 is carried on a shaft 70 spanning the spaced arms 72 of a carrier 74 which is pivoted at 76 upon a housing 78. A heavy spring 80 surrounding the pivot pin 76 may have one end 82 pressed against the carrier to yieldingly maintain the element 68 in projected position, while the opposite end 84 of the spring rests upon an adjusting nut 86 that may be elevated and lowered by means of adjusting screw 88 to regulate the spring force.

The door 18 of FIG. 10, with the application thereon of sufficient force, may be pushed open away from frame 20 because the slope of strike face 66 will cam the roller 68 into housing 78 against the resistance of spring 80, the housing 78 remaining stationary. Likewise, in closing the door, the roller 68 will be momentarily displaced into housing 78 as the cam face 90 of the strike sweeps against the roller. Upon full closing of the door, roller 68 will always rest forcefully upon strike face 66, to resist with some effect any movement of the door toward open position.

In order to at times overcome the tendency of roller 68 to press the door closed, means are provided to bodily shift the housing 78 away from the strike, so that roller 68 moving therewith may be displaced from the path of movement of the door (see FIG. 11). Thus, the door is released for easy swinging toward open position. Such displacement of the fastener roller, according to the present invention, is to be performed pneumatically at the instant the door-swinging cylinder 42 is activated to open the door. Timely release of the door at the fasteners relieves the cylinder of an initial overload which, if not relieved in advance, would cause a pressure build-up in the cylinder followed by a sudden release of the door, causing a dangerous fast opening of the door at the start of its travel. By deactivating or unlocking the fasteners at the time of activating the cylinder, a gradual opening movement is assumed and all danger of sudden unexpected impact is eliminated.

For bodily shiftability of the fastener housing 78 as above related, the housing may be slidably supported upon an elongate base plate 92, which latter may be welded or otherwise fixed upon a mounting plate 94 adapted for attachment to frame 20 by means of screws 96. Base plate 92 may carry suitable fixed brackets 98 held by screws 100, which embrace and securely hold an air cylinder 102 arranged lengthwise of the base plate in the direction of slidability of the housing 78.

The cylinder 102 contains the usual piston, normally disposed near the base end 104 of the cylinder, and adapted for projection to the left in FIGS. 9 to 11, when air under pressure is fed to the fitting or port 106. An exhaust port for the head end 108 of the cylinder is indicated at 110.

The piston of cylinder 102 may carry a bolt 112, the shank of which projects through the cylinder head to dispose the bolt head 114 through and beyond the bracket 98. The opposite end of bolt 112 may threadedly engage a central tapped hole in the piston, so that by rotating the bolt relative to the piston, its head 114 may be extended or retracted relative to the piston for purposes of adjustment to be explained presently.

Referring to FIG. 9, 116 indicates a draw bar which may be in the form of a yoke having a pair of arms 118 each fixed at 120 to opposite sides of the housing 78. The connecting portion or base 122 of the yoke normally abuts the head of the adjusting screw 112, so that upon advancement of the piston in cylinder 102, the yoke is moved by the screw to draw the housing 78 bodily away from the strike 64, as in FIG. 11.

When pressure of air into the fitting 106 is terminated, a compression spring 124 located intermediate the housing 78 and the base of cylinder 102, returns the housing to the initial position of FIGS. 9 and 10 at which the roller 68 may again intercept the strike as the door closes, and act to hold it forcefully against the frame 20. A pilot pin for spring 124, fixed to the rear wall 126 of housing 78, is indicated at 128.

The base plate 92 carries suitable guide means for the movable housing 78, which guide means may be in the form of opposed side channels 130 in which may slide the oppositely extending base flanges 132 of the housing. By regulating the extent to which the screw head 114 projects from the head end of cylinder 102, the roller 68 may be adjusted to the strike 64, for achieving a desired value of holding power of the door fastener. Anchor screws for the strike are indicated at 134.

From the foregoing, it will be understood that the roller or impact element 68 of the door fastener remains in position to co-operate with the strike 64, as in FIGS. 9 and 10, until such time as air under pressure is delivered to cylinder 102 for withdrawing the roller and its housing 78 to the inactive position of FIG. 11. Upon termination of the air feed to the cylinder, the roller and its housing 78 are returned to the operative or active position by the force of spring 124 applied against the rear wall 126 of the housing. As previously stated herein, pressure of air is delivered to cylinder 102 at its fitting 106, substantially concurrently with delivery of air pressure to the head end of the door opening cylinder 42.

FIGS. 13, 14 and 15 illustrate snubbers to limit and cushion movements of the doors to the extreme open position. The snubbers, indicated at 30 in FIG. 13, and at 38 in FIG. 15, are identical so that a description of one will suffice for the other also.

Snubber 30 may comprise a pair of telescopic housings 136 and 138 enclosing one or more compression springs 140 preloaded so that the housings are constantly yieldingly extended from one another, to a limit determined by stop means 142. The stop means may consist of a pair of pins spanning the spaced legs of housing 136, as shown, and adapted normally to bear upon extending ears 144 of housing 138. In the embodiment illustrated, housing 138 is in the form of a U-channel, having a base 146 which may be bolted as at 148 to a bracket 150 supporting the housing at a distance from wall 28. The distance of the housing base from the wall may approximate the space between the outer face of the wall and the outer face of the door.

Housing 136 likewise may be of U-channel shape, with its depending spaced legs embracing loosely the legs of the other housing, for sliding movement thereon in the direction of the spring action. Application of force against the base 152 of housing 136 will depress this housing bodily relative to housing 138, against the resistance of the enclosed springs. Upon removal of the compressive force, housing 136 will, of course, be bodily extended by the springs until the pins 142 thereof strike the stop lugs 144 of the stationary housing 138.

As FIG. 13 clearly indicates, the door 18 has applied thereto, near the axis of hinge 22, an outstanding tappet 154 fixed to the door by means of screws or the like 156, and reinforced as by means of a plate 158. When the door 18 is swung open about the hinge pin 160, in the direction of the arrow 162, the tappet moves with the door to the broken line position of FIG. 13, to depress the snubber and thereby cushion the door swing at its limit of opening. The tappet may carry an adjusting screw 164 retained by a lock nut 166, for regulating the extent and the timing of the snubbing action imposed upon the door. The head of the adjusting screw is adapted to contact the base 152 of snubber housing 136, when the door is swung open. Bracket 150 may be fixed to the door frame 20 by screws or bolts 168.

The snubber arrangement above described applies to a situation wherein the door is of the inset type of FIG. 13, or FIG. 1. In the case of an overlapping door such as is illustrated by FIGS. 2 and 15, the snubber indicated at 38 of FIG. 15 may be supported upon a fixed bracket 170 at the approximate level of door frame 20, the bracket being preferably bolted or screwed to the frame at 172. In this instance the tappet 174 is mounted flatwise upon the outer face of door 34, and may be fixed in adjusted positions of extension beyond the hinged side edge of the door through the agency of a clamp bolt 176 passing through an elongate slot 178 of the tappet. The mount for the tappet may comprise an angle piece 180 fixed at 182 upon the side edge of the door.

When door 34 is swung to open position about the pin 184 of hinge 36, the head 186 of the tappet strikes and depresses the snubber as indicated by broken lines in FIG. 15, to cushion and limit the opening movement of the door. If desired, the head 186 of the tappet may be provided with the adjusting means of FIG. 13.

As was previously mentioned herein, the door of the compartment is to be swung open and closed by pneumatic means, at the will of an operator requiring ingress or egress. For this purpose, electric switches 188 and 190 (FIG. 5) are made accessible inside and outside the compartment served by the door. The switches may be of the single pole double throw type shown.

In the diagram, FIG. 5, the fixed contacts of switch 188 are numbered 192 and 194, and those of switch 190 are numbered 196 and 198. Conductors between these contacts are numbered 200 and 202. Line wires from a source of electricity are shown at 204 and 206. Leads to a solenoid 208 are numbered 210 and 212, and in series with the solenoid and the line wire is connected a normally closed air-operated electric switch 214. A second air-operated switch 216 is connected in series with the solenoid and the line wire 204, this second switch being normally open-circuited. A shunt conductor 218 connects the solenoid lead 210 with the movable contact of switch 190. The solenoid plunger is indicated at 209, FIGS. 6, 7, and 8.

The function of the solenoid is to shift a valve 220, FIG. 6, within the bore 222 of an air control unit indicated generally at 224. Valve 220 moves with the solenoid plunger 209, and is biased in one direction by a compressive spring 226 the compressive force of which may be overcome by excitation of the solenoid acting to move the valve toward the left, as in FIG. 7. Whenever the solenoid is de-energized, the spring 226 shifts the valve 220 and the solenoid plunger toward the right, as in FIGS. 6 and 8.

At substantially the middle portion of valve bore 222, an air feed pipe or tube 228 delivers air under pressure constantly from a source 230 to the bore, at one side or the other of valve 220, depending upon the position of the valve within the bore. Outlet ports in the form of flexible tubes 232 and 234 are located in the valve body at equal distances from feed pipe 228, and these serve to convey air under pressure to opposite ends of the door moving cylinder 42, depending upon the position of valve 220. In the FIG. 6 position of valve 220, for example, air from feed pipe 228 may pass to tube 232, but not to tube 234. In the FIG. 7 position of valve 220, air may pass to tube 234, but not to tube 232.

Tube 232, as shown in FIG. 1, has connection at 60 to the base end of cylinder 42, whereas tube 234 has connection at 58 to the head end of the cylinder. Accordingly, by shifting the valve 220 to one side or the other of the air entry tube 228, air under pressure may be directed to the cylinder 42 at either end, for selectively opening or closing the door pneumatically.

The body of unit 224 has two exhaust ports or nozzles indicated at 236 and 238, spaced apart at a greater distance than the space between the outlet ports 232 and 234. The nozzle or jet 236 is arranged to deliver a jet of exhaust air which, by its own force, will open the normally closed switch 214. Similarly, the nozzle or jet 238 will under certain conditions release a jet of air active upon the normally open switch 216, to effect a closing of said switch.

The exhaust air for operating the switches 214 and 216 comes from the exhausting end of door cylinder 42, resulting from delivery of air pressure to the opposite end of the cylinder. For example, if valve 220 is positioned as in FIG. 7 to direct air pressure to tube 234 and the end 46 of the cylinder, for opening the door, the opposite end 48 of the cylinder will exhaust air through tube 232, and nozzle 238, for closing the normally open switch 216. On the other hand, if valve 220 is disposed in the FIG. 6 position to direct air pressure from pipe 228 to tube 232 and the end 48 of the cylinder for closing the door, the opposite end 46 of the cylinder will exhaust air through tube 234, and nozzle 236, for opening the normally closed switch 214.

The foregoing described operations of the jets or nozzles are under the control of two slide valves 240 and 242, each spaced from valve 220 at opposite sides thereof, and movable therewith. When valve 220 and its slide valves are disposed to the right end of the valve body bore, as in FIG. 6, jet 236 is uncovered, and jet 238 is blocked. In FIG. 7 position of the valves, however, jet 236 is blocked and jet 238 is uncovered. The valves are disposable to only two positions, shown in FIGS. 6 and 7, and these are dependent upon energization of the solenoid 208, and de-energization thereof. That is, energization of the solenoid shifts the valves to the left, against the resistance of spring 226, and de-energization of the solenoid allows the spring to move the valves to the right, along with the solenoid plunger.

It may here be noted that with every shift of valve 220 to the left, for placing tube 234 in communication with air feed pipe 228 to open the door, a portion of the air directed toward the cylinder is shunted off into a tube 246 which conveys air under pressure to the cylinders of the door fasteners 26, to release the door strikes as previously explained. The door fastener cylinders will be activated by the air pressure to maintain a retracted condition of the fastener impact element 68, as long as air is fed to the door operating cylinder for opening the door. Upon reversal of the door opening cylinder to close the door, valve 220 will assume the shifted position of FIG. 6, at which the door fastener cylinders 102 may exhaust through tubes 246 and 234 into the unit 224, escaping through jet or nozzle 236. This exhausting of door fastener cylinder 102 is effected by the action of its associated spring 124.

With further reference to the exhaust jets or nozzles 236 and 238, FIGS. 3 and 4 illustrate how air exhausted through these nozzles may be caused to actuate the electric switches 214 and 216. In FIG. 4, switch 214 is seen to have an operating arm 250 hinged at one end 252 upon the switch housing, the arm carrying at its free end a cup 254 which normally overlies the jet or nozzle 236. When air is projected through the nozzle against the cup 254, the cup is displaced to actuate the switch. Termination of exhaust air through the nozzle allows the switch to resume its normal closed-circuit condition, with the cup returning to covering relationship upon the nozzle. The same arrangement of a cup over the nozzle 238 serves to actuate the normally open switch 216 in the same manner.

Switches 214 and 216 may desirably be housed within a case 256. The characters 258, 260, and 262 indicate an electric service box and conduits for the electric conductors constituting the control circuit of FIG. 5. These various elements, along with the solenoid operated valve and other accessories shown, may be conveniently mounted upon a wall panel 264. An air dryer 266 and a shut-off cock 268 for the compressed air supply, are indicated.

In order to disable the entire pneumatic system so that the door may be opened and closed manually, relief valves 270 and 272 may be furnished in the air pipes which lead from valve 224 to the opposite ends of the door-operating cylinder. Thus in FIG. 3, valve 270 may relieve pressure in the tube 234, whereas valve 272 connected by tubing 274 with the air line 232, may be opened to relieve pressure in line 232. Valve 272, which, by reason of its connection with tube 232, relieves pressure in the closing side of the door-operating cylinder, will advantageously be located inside the compartment closed by the door, so that it may be accessible to anyone trapped within the compartment due to mechanical or electrical failure. Opening the relief valve 272 will allow free displacement of air from the base end 48 of the cylinder as a person trapped within pushes the door open manually. Resistance to subsequent closing of the door is relieved by opening the valve 270, and closing the valve 268. This conditions the entire system for manual operation.

From the foregoing, it will be understood that valve 272, accessible inside the compartment closed by the door, constitutes a safety device which eliminates the danger of a person becoming trapped within, should a failure occur in the compressed air source or in other elements of the system.

It may here be noted that the control apparatus of FIG. 2 omits the pneumatically operated door fasteners shown at 26 of FIG. 1, thereby indicating that the apparatus is operative with or without such fasteners. In all other respects the door of FIG. 2 is subject to the same control as the door of FIG. 1.

The operation of the door control apparatus is as follows:

Assuming that the door of FIG. 1 is closed as shown, the air valve and switches will be disposed as indicated upon FIG. 6, and FIG. 5. A person wishing to open the door and enter the compartment actuates the exteriorly disposed switch 190, thereby to establish the electric circuit 204, 188, 200, 190, 218, 210, 208, 212, 214, and 206, to energize the solenoid 208 and thereby shift valve 220 to the FIG. 7 position.

Compressed air thereupon will enter the air control valve at 228, and pass therethrough to tube 234 which leads to the head end of the door operating cylinder 42. A portion of the air so directed to tube 234 will be shunted into tube 246 (FIG. 3) which leads to the cylinders 102 of the door fasteners 26. Accordingly, the door will be pneumatically released at fasteners 26, and swung open by the action of cylinder 42. During this opening cycle of the door, air exhausting from the base end 48 of door operating cylinder 42 will enter the air control valve through tube 232, and leave the valve through nozzle 238, thereby to close the normally open electric switch 216. This closing of switch 216 maintains the electric circuit through solenoid 208 by connecting the solenoid directly in series with line wire 204; therefore, any manipulation of switches 188 or 190 during the opening cycle of the door will not be permitted to interfere with the continued opening of the door to its open limit. The normally closed electric switch 214 will, during the opening cycle of the door, remain closed due to blocking of nozzle 236 by the slide valve 242, FIG. 7.

When the door reaches its limit of opening, it will be cushioned by the snubber 30 and brought to a halt. Switch 216 thereupon will return to the normally open position due to a lack of exhaust air from the base end of the door-opening cylinder, which now is static. Notwithstanding the opening of switch 216, however, the electric circuit to solenoid 208 will remain closed through switches 188 and 190 (switch 190 having been shifted to contact 196 to initiate the door opening cycle). The air valve therefore will remain in the FIG. 7 position, to continue directing compressed air to tube 234 which feeds the head end 46 of the door operating cylinder 75 to hold the door open. This condition persists until someone actuates one of the switches 188 or 190, inside or outside the compartment.

While the valve remains in the FIG. 7 condition to ensure an open position of the door, air shunted into tube 246 (FIG. 3) will keep the door fasteners 26 deactivated as previously explained.

Now, if the door of the compartment is to be closed, a workman may operate either the inside switch 188 or the outside switch 190, to there break the circuit of solenoid 208. The air valve 220 will thereupon be moved by its spring 226 to the FIG. 8 position, at which compressed air from pipe 228 will be directed through the valve to tube 232 which conveys the air to the base end 48 of the door-operating cylinder, to swing the door closed. The opposite end 46 of said cylinder thereupon will exhaust through tube 234 and into the air valve, to escape through nozzle 236 and thereby open the normally closed switch 214. This ensures an open circuit for the solenoid during the entire closing movement of the door, so that the closing cycle may not be interrupted by anyone manipulating either of the manual switches 188 or 190 while the door is closing.

During exhaust of air through nozzle 236 as just recited, an exhaust of air from the door fastener piston 102 will occur through tubes 246 and 234, and nozzle 236, thereby to restore the door fastener to the operative condition of FIG. 10, at which the strike 64 may actuate the roller 68 and be held thereby in the closed door position.

When the door reaches the fully closed position, the piston rod of the door operating cylinder 42 will be fully extended and will come to rest. This will terminate exhaust of air from the head end of the cylinder, resulting in self-closing of switch 214, FIG. 8. The control circuit of FIG. 5 thereby will be conditioned as indicated in FIG. 5 for a subsequent door-opening operation. Switch 216 will remain in its normally open condition, due to blocking of nozzle 238 by slide valve 240. Air from supply pipe 228 will continue to impress its force upon the piston of the door-operating cylinder, through tube 232, as will be evident by reference to FIG. 8.

As long as the door remains closed, therefore, pressure of air will be imposed upon the piston of the door-operating cylinder to urge the door to closed position.

Should it be desired now to again open the compartment door, a person may actuate either the inside switch 188 or the outside switch 190, to repeat the opening cycle as previously explained in detail herein.

It is to be understood that various modifications and changes in the structural details of the apparatus may be resorted to, within the scope of the appended claims, without departing from the spirit of the invention.

What is claimed is:

1. Control apparatus for a compartment door hinged for swinging movement relative to a doorway, comprising in combination, a source of compressed air, an elongate air cylinder having a base end and a head end, and a piston rod reciprocable through the head end of the cylinder, means pivoting the cylinder base end and the free end of the piston rod to a support and to the door, respectively, in position to move the door to open and closed positions upn selective application of air pressure to the cylinder ends, pneumatic means including a shiftable valve and tubes interconnecting the valve with opposite ends of the cylinder, whereby shifting of the valve alternatively directs air pressure to opposite ends of the cylinder for moving the door, electrical means for shifting the valve including a plurality of circuit control switches, and means for actuating said switches by the force of air exhausted from one end of the door-operating cylinder while the opposite end is charged with air presure from the compressed air source.

2. Control apparatus for a compartment door hinged for swinging movement relative to a doorway, comprising in combination, a source of compressed air, an elongate air cylinder having a base end and a head end, and a piston rod reciprocable through the head end of the cylinder, means pivoting the cylinder base end and the free end of the piston rod to a support and to the door, respectively, in position to move the door to open and closed positions upon selective application of air pressure to the cylinder ends, a shiftable control valve, and tubes connecting the valve with opposite ends of the cylinder, the connections serving to transmit compressed air to the cylinder ends alternatively as the valve is shifted between limits, for activating the cylinder to open and close the door, means under human control for shifting the valve as stated, and means operative to preclude human control of the valve while the door is in movement, said last named means being controlled by air exhausted from one end of the cylinder while air under pressure is undergoing delivery to the opposite end of the cylinder.

3. Control apparatus for a compartment door hinged for swinging movement relative to a doorway, comprising in combination, a source of compressed air, an elongate air cylinder having a base end and a head end, and a piston rod reciprocable through the head end of the cylinder, means pivoting the cylinder base end and the free end of the piston rod to a support and to the door, respectively, in position to move the door to open and closed positions upon selective application of air pressure to the cylinder ends, a control valve shiftable between two limits of travel, and tubes near each limit connecting the valve with opposite ends of the cylinder, the connections serving to transmit compressed air to the cylinder ends alternatively as the valve is shifted to one or the other limit of its travel, for activating the cylinder to open and close the door, an electrical circuit including a pair of electric switches under human control, and an electromagnetic device for shifting the control valve upon manual closing of one of said switches, and means operative whenever the door is in motion, to deliver the electromagnetic device from the control of the manually operated electric switches, until such time as the door reaches the end of its travel, said last named means being activated by air exhausted from one end of the cylinder while air under pressure is undergoing delivery to the opposite end of the cylinder.

References Cited in the file of this patent

UNITED STATES PATENTS

| | | |
|---|---|---|
| 2,240,853 | Nelson | May 6, 1941 |
| 2,586,442 | Seagren | Feb. 19, 1952 |
| 2,726,893 | Zucker | Dec. 13, 1955 |
| 2,733,918 | Fischer | Feb. 7, 1956 |
| 2,741,478 | Mercier | Apr. 10, 1956 |
| 2,865,629 | Henkel | Dec. 23, 1958 |
| 2,893,725 | Katz | July 7, 1959 |
| 2,917,306 | Fleckop et al. | Dec. 15, 1959 |
| 2,927,811 | Rea et al. | Mar. 8, 1960 |
| 2,971,227 | Eliot | Feb. 14, 1961 |
| 2,972,788 | Shean | Feb. 28, 1961 |
| 3,017,867 | Brunsell | Jan. 23, 1962 |
| 3,068,952 | Pilkington et al. | Dec. 18, 1962 |